US010325191B2

(12) United States Patent
Dixon et al.

(10) Patent No.: US 10,325,191 B2
(45) Date of Patent: Jun. 18, 2019

(54) METHOD AND SYSTEM FOR PROVIDING A BARCODE IMAGE OVER A NETWORK

(71) Applicants: Kyle M. Dixon, Germantown, TN (US); Stephen M. Dearing, Herndon, VA (US)

(72) Inventors: Kyle M. Dixon, Germantown, TN (US); Stephen M. Dearing, Herndon, VA (US)

(73) Assignee: United States Postal Service, Washington, DC (US)

( * ) Notice: Subject to any disclaimer, the term of this patent is extended or adjusted under 35 U.S.C. 154(b) by 11 days.

(21) Appl. No.: 13/773,099

(22) Filed: Feb. 21, 2013

(65) Prior Publication Data

US 2013/0206849 A1   Aug. 15, 2013

Related U.S. Application Data

(60) Continuation of application No. 11/645,531, filed on Dec. 27, 2006, now Pat. No. 8,401,976, which is a division of application No. 10/953,530, filed on Sep. 30, 2004, now abandoned.

(60) Provisional application No. 60/581,373, filed on Jun. 22, 2004.

(51) Int. Cl.
*G07B 17/00* (2006.01)
*G06K 19/06* (2006.01)
*G06Q 10/08* (2012.01)
*G06F 16/955* (2019.01)

(52) U.S. Cl.
CPC .... *G06K 19/06112* (2013.01); *G06F 16/9554* (2019.01); *G06Q 10/08* (2013.01); *G07B 17/00508* (2013.01); *G07B 17/00733* (2013.01); *G07B 2017/00145* (2013.01); *G07B 2017/00161* (2013.01); *G07B 2017/00588* (2013.01)

(58) Field of Classification Search
CPC .......... G06K 19/06112; G06F 16/9554; G07B 2017/00588; G06Q 10/08
USPC ....... 705/1.1, 60–62, 67, 70, 26.1, 401–411; 235/462.08, 462.01, 494; 713/179
See application file for complete search history.

(56) References Cited

U.S. PATENT DOCUMENTS

| 4,739,479 A | 4/1988 | Tamada et al. |
| 4,791,281 A | 12/1988 | Johnsen et al. |
| 5,249,687 A | 10/1993 | Rosenbaum et al. |

(Continued)

FOREIGN PATENT DOCUMENTS

| JP | 10-51485 | 2/1998 |
| JP | 2003-150474 | 5/2003 |
| WO | WO 02/21372 | 3/2002 |

OTHER PUBLICATIONS

King, K.N., "C Programming, A Modern Approach," 1996 (11 pages).
International Preliminary Report on Patentability dated Jan. 11, 2007, for International Application No. PCT/US2004/031941, filed Sep. 30, 2004 (16 pages).

(Continued)

*Primary Examiner* — Igor N Borissov
(74) *Attorney, Agent, or Firm* — Finnegan, Henderson, Farabow, Garrett & Dunner L.L.P.

(57) ABSTRACT

Methods and systems consistent with the present invention provide a barcode image. A client is operable to create a request for a barcode image and send the request to a server. The request comprises data to be converted to a barcode. The server is operable to receive the request from the client via a network, generate a barcode image from the data, and encode the barcode image. Thereafter, the server provides the encoded image to the client.

15 Claims, 9 Drawing Sheets

(56) References Cited

U.S. PATENT DOCUMENTS

| | | | |
|---|---|---|---|
| 5,510,604 | A | 4/1996 | England |
| 5,697,504 | A | 12/1997 | Hiramatsu et al. |
| 5,710,886 | A | 1/1998 | Christensen et al. |
| 5,805,740 | A | 9/1998 | Takagi et al. |
| 5,862,243 | A | 1/1999 | Baker et al. |
| 5,938,727 | A | 8/1999 | Ikeda |
| 5,984,174 | A | 11/1999 | Kato et al. |
| 6,005,945 | A * | 12/1999 | Whitehouse .................... 380/51 |
| 6,360,001 | B1 | 3/2002 | Berger et al. |
| 6,708,208 | B1 | 3/2004 | Philyaw |
| 6,874,131 | B2 | 3/2005 | Blumberg |
| 7,025,268 | B2 | 4/2006 | Alleshouse |
| 2002/0029253 | A1 | 3/2002 | Rhoads |
| 2002/0051177 | A1 | 5/2002 | Nomoto |
| 2002/0131071 | A1 | 9/2002 | Parry |
| 2002/0169623 | A1 | 11/2002 | Call et al. |
| 2003/0120505 | A1* | 6/2003 | Spiegel ............................ 705/1 |
| 2004/0019792 | A1 | 1/2004 | Funamoto et al. |
| 2004/0039634 | A1 | 2/2004 | Cook |
| 2004/0089727 | A1 | 5/2004 | Baharav et al. |
| 2004/0218783 | A1 | 11/2004 | Mampe et al. |
| 2005/0108164 | A1* | 5/2005 | Salafia et al. .................. 705/42 |
| 2005/0109846 | A1 | 5/2005 | Lubow |
| 2005/0283448 | A1 | 12/2005 | Dixon et al. |
| 2006/0053050 | A1 | 3/2006 | Schweier |

OTHER PUBLICATIONS

International Search Report, for International Application No. PCT/US2004/031941, filed Sep. 30, 2004.

Hallogram Publishing, "dBest Barcode Fonts for Windows," Sep. 10, 2004, pp. 1-2 Aurora, Colorado.

Hallogram Publishing, "Barcode Software," Sep. 10, 2004, pp. 1-2, Aurora, Colorado.

Final Office Action dated Mar. 9, 2010, for U.S. Appl. No. 10/953,530, filed Sep. 30, 2004 (9 pages).

Final Office Action dated Jul. 8, 2010, for U.S. Appl. No. 10/953,530, filed Sep. 30, 2004 (13 pages).

Final Office Action dated Oct. 28, 2010, for U.S. Appl. No. 10/953,530, filed Sep. 30, 2004 (17 pages).

Office Action dated Jul. 1, 2005, for U.S. Appl. No. 10/953,530, filed Sep. 30, 2004 (43 pages).

Office Action dated Jan. 5, 2007, for U.S. Appl. No. 10/953,530, filed Sep. 30, 2004 (7 pages).

Office Action dated Sep. 24, 2007, for U.S. Appl. No. 10/953,530, filed Sep. 30, 2004 (10 pages).

Office Action dated Apr. 16, 2008, for U.S. Appl. No. 10/953,530, filed Sep. 30, 2004 (10 pages).

Office Action dated Jan. 27, 2009, for U.S. Appl. No. 10/953,530, filed Sep. 30, 2004 (10 pages).

Office Action dated Sep. 16, 2009, for U.S. Appl. No. 10/953,530, filed Sep. 30, 2004 (10 pages).

* cited by examiner

METHOD AND SYSTEM FOR PROVIDING A BARCODE IMAGE OVER A NETWORK

RELATED APPLICATIONS

This application is a continuation of U.S. patent application Ser. No. 11/645,531, filed Dec. 27, 2006, which is a divisional of U.S. patent application Ser. No. 10/953,530, filed Sep. 30, 2004, and claims the benefit of U.S. Provisional Patent Application No. 60/581,373, entitled "Method and System for Providing a GIF Image Using Internet Browser," which was filed on Jun. 22, 2004, the disclosures of which are all expressly incorporated herein by reference in their entirety.

TECHNICAL FIELD

The present invention relates generally to data processing systems and, more particularly, to a method and system for providing a barcode image over a network.

BACKGROUND

Many businesses use barcode technology to accurately and expediently gather data. For example, a delivery service provider, such as the United States Postal Service (USPS), may use barcodes to rapidly identify destinations of delivery items. In another example, a grocery store retailer may use barcodes to identify products that it sells.

A barcode typically includes a series of parallel adjacent bars and spaces. Predetermined width of spaces may be used to encode data into an image. To decode information contained in a barcode, a scanning device, such as a bar reader, may be moved across the image of a barcode from one side to another. As a scanning device moves across the image, the barcode width pattern may be analyzed by the barcode decoder recovering the original encoded data.

Barcodes come in many different formats. Exemplary barcode formats include Universal Product Code (UPC), PostNet, Code 39, PLANET™, Code 128, Codabar, etc.

In order to utilize or facilitate the services provided by a delivery service provider, a user may need to generate and print barcodes at a client computer associated with the delivery service provider. Currently, in order to generate and print barcodes, a client computer may utilize a special font or software such as BarTender, so that when a series of numbers or letters are typed in, they are encoded to a barcode. Such a font or software, however, needs to be resident on the client computer. In the case that a user needs to generate different types of barcodes using the same client computer, multiple fonts or barcode-specific software may need to be resident on the client computer. These additional fonts or software may consume valuable memory on client computers.

In a situation where the users are employees of a delivery service provider, in order to ensure consistent and uniform performance by all its employees, a delivery service provider may need to install the same barcode-specific software on client computers operated by its employees. Having special barcode printing software such as, for example, BarTender, installed on each of these client computers may require coordination of downloading of software updates in a timely manner. Having barcode printing software installed on each user computer may also present interchangeability problems if a hardware upgrade is required. It is therefore desirable to provide a method and a system for providing a barcode image generated from one centralized location to users for subsequent printing without installing special software or font on a client computer.

SUMMARY

Methods and systems consistent with the present invention provide a barcode image. A client is operable to create a request for a barcode image and send the request to a server. The request comprises data to be converted to a barcode. The server is operable to receive the request from the client via a network, generate a barcode image from the data, and encode the barcode image. Thereafter, the server provides the encoded image to the client.

Other methods and systems consistent with the present invention provide a dynamic image. A client is operable to create a request for a dynamic image and send the request to a server. The request comprises data to be converted to the dynamic. The server is operable to receive the request from the client via a network, generate a dynamic image from the data, and encode the dynamic image. Thereafter, the server provides the encoded image to the client, which displays and prints the encoded image using a network browser program.

Other methods and systems consistent with the present invention also provide a barcode image. A client is operable to receive address information and convert the address information to a delivery code. The client also creates a request for a barcode image, where the request includes the delivery code as data to be converted to a barcode. The server is operable to receive the request from the client via a network, generate a barcode image from the data, and encode the barcode image. Thereafter, the server provides the encoded image to the client.

BRIEF DESCRIPTION OF THE DRAWINGS

The accompanying drawings, which are incorporated in and constitute a part of this specification, illustrate one embodiment of the invention and, together with the description, serve to explain the principles of the invention.

DETAILED DESCRIPTION

Reference will now be made in detail to exemplary embodiments of the present invention, examples of which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Overview

Figure 1:
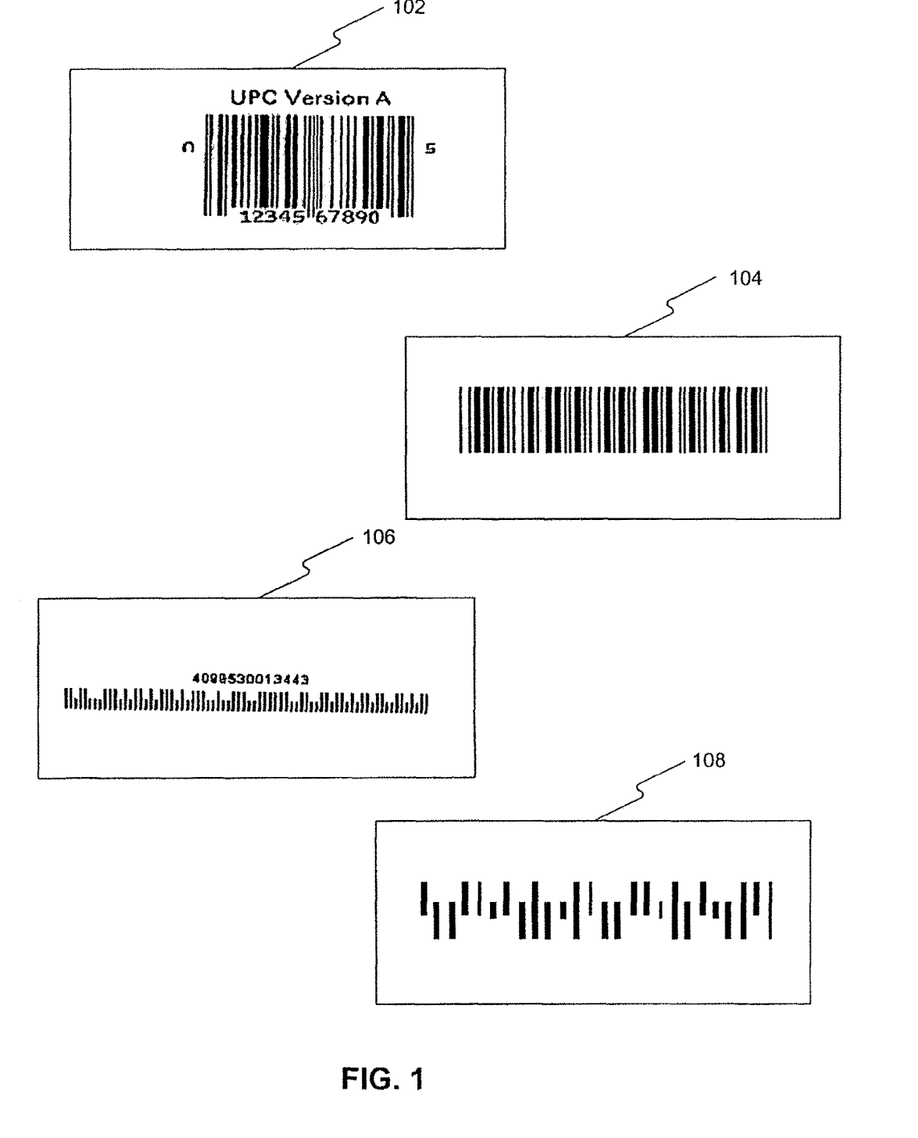
FIG. 1 is a diagram of an exemplary barcodes in different formats.

There are many different types of barcodes available for use. For example, FIG. 1 depicts exemplary Universal Product Code (UPC) (102), Code 39 barcode (104), PLANET™ barcode (106), and four-state barcode (108). A user may need to request, generate, and print a barcode, encoding information in one or more barcodes formats. For example, a USPS employee may need to request, generate, and print a barcode in the Code 39 format representing a delivery route for subsequent placing in a routing book to be used by a mail delivery person.

Methods and systems consistent with the present invention facilitate generation of barcodes in one centralized location by enabling a delivery service provider, such as the USPS, to install barcode generating software on a designated server. After a designated server receives a request for generating a barcode from a client, it may generate a barcode. Once a barcode is generated, its image may be forwarded back to the client.

It is possible for the designated server to contain barcode generating software for more than one type of a barcode. In this situation, a request for generation of a barcode may include a request for one or more specific formats of a barcode.

Network Environment

Figure 2:
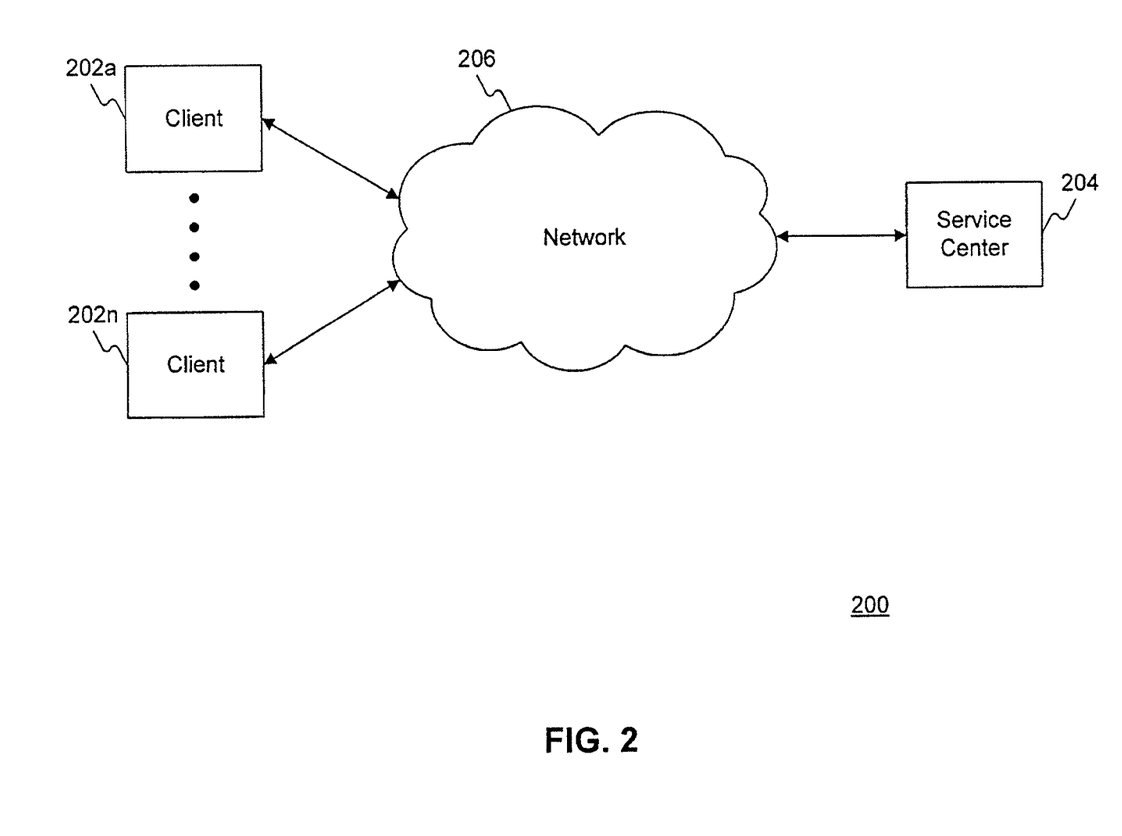
FIG. 2 is a diagram of an exemplary network environment in which features and aspects consistent with the principles of the present invention may be implemented.

FIG. 2 is a block diagram of a network environment 200, in which features and aspects consistent with the present invention may be implemented. The number of components in environment 200 is not limited to what is shown and other variations in the number of arrangements of components are possible, consistent with embodiments of the invention. The components of FIG. 2 may be implemented through hardware, software, and/or firmware. Network environment 200 may include clients 202a-202n, a service center 204, and a network 206.

Network 206 provides communications between the various entities' depicted in network environment 200, such as a client 202 and service center 204. Network 206 may be a shared, public, or private network and may encompass a wide area or local area. Network 206 may be implemented through any suitable combination of wired and/or wireless communication networks. By way of example, network 206 may be implemented through a wide area network (WAN), local area network (LAN), an intranet and/or the Internet.

Clients 202a-202n provide users with an interface to network 206. Clients 202a-202n may be implemented using any computer capable of accessing network 206, such as a general purpose computer or personal computer equipped with a modem. A client 202 may receive information from a user that is to be encoded into a barcode. In response, a client 202 may send a request for a barcode to service center 204. Once service center 204 has created a barcode image corresponding to the request and has sent the barcode image to the client 202, the client may display and print the barcode image.

Service center 204 is operable to receive a request for a barcode from a client 202 via network 206, and in response create a barcode image. The barcode may be one of many different types of barcodes. Service center 204 also sends the barcode image to the client 202 that requested the barcode, where the barcode may be displayed and/or printed.

Figure 3:
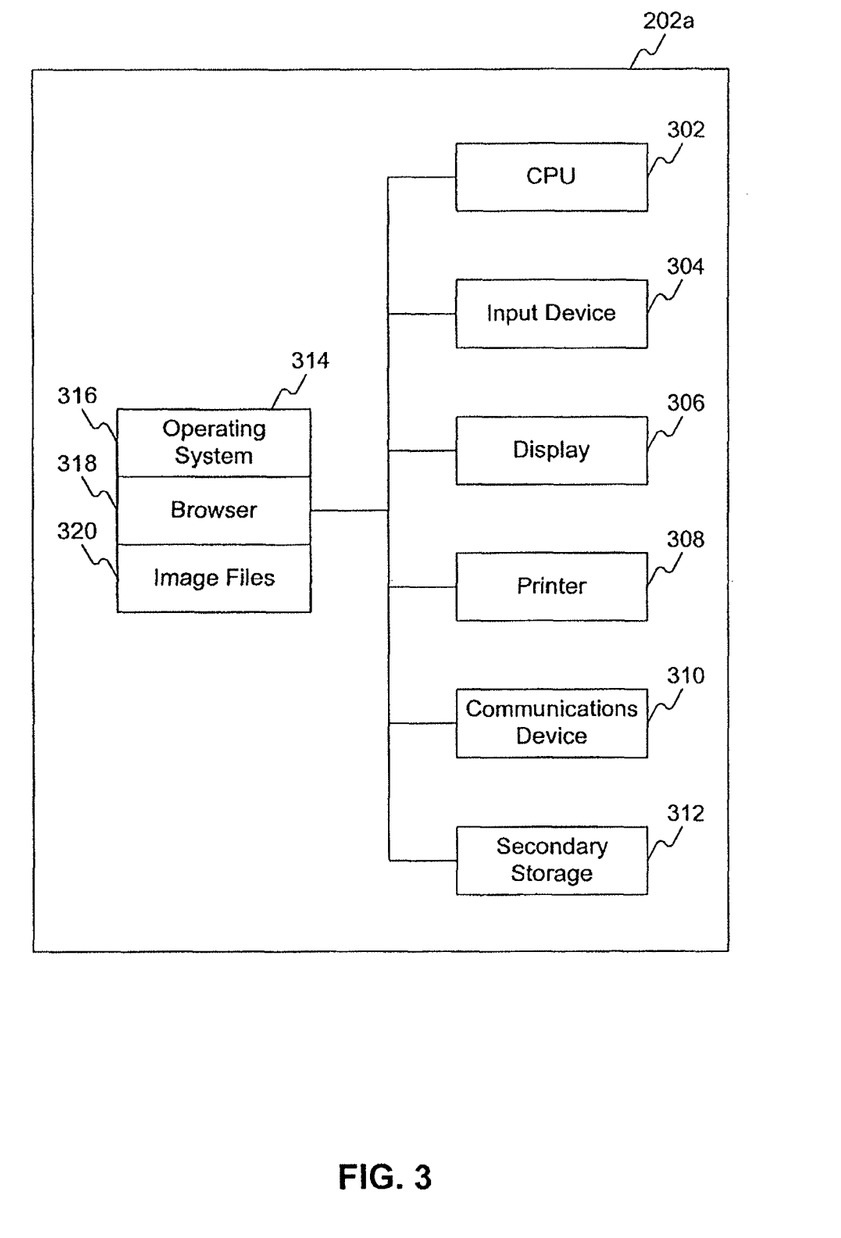
FIG. 3 is a diagram of an exemplary client, consistent with the principles of the present invention.

FIG. 3 is a diagram of an exemplary client consistent with the principles of the present invention. A client, such as client 202a, may include a CPU 302, an input device 304, a display 306, a printer 308, a communications device 310, secondary storage 312, and a memory 314. Memory 314 may include operating system 316, browser 318, and image files 320. The number of components in client 202a is not limited to what is shown and other variations in the number of arrangements of components are possible, consistent with embodiments of the invention.

CPU 302 may be one or more known processing devices, such as a Pentium™ microprocessor manufactured by Intel Corporation. Secondary storage 312 may be one or more data storage mediums such as a hard drive, CD-ROM drive, DVD drive, floppy drive, etc. Control of client 202a as well as data input by a user may be achieved through input device 304, which may comprise a keyboard, a pointer device, a mouse, etc. Data output may be presented to a user of the web server through display 306 and/or another output device, such as printer 308.

Memory 314 may be one or more storage devices configured to store data used by CPU 302 to perform certain functions related to embodiments of the present invention. Memory 314 may be a magnetic, semiconductor, tape, or optical type of storage device. Software and other applications may be loaded into secondary storage 312 and/or memory 314 using, for example, a computer readable medium with a software or program application that is read by secondary storage 312. Software may also be installed via network 206 and communications device 310.

Memory 314 may include operating system 316, browser 318, and image files 320. Operating system 316 may be implemented using any operating system suitable for a desktop or laptop computer, such as Windows 2000 manufactured by Microsoft Corporation. Browser 318 may be implemented using any Internet browser suitable for a desktop or laptop computer, such as Internet Explorer manufactured by Microsoft Corporation.

Image files 320 may be barcode images or other images received from service center 204. For example, service center 204, in response to a request from a client 202, may create a barcode image or other images and subsequently send these images back to client 202. An image file 320, such as a barcode image, may be printed using, for example, printer 308.

Figure 4:
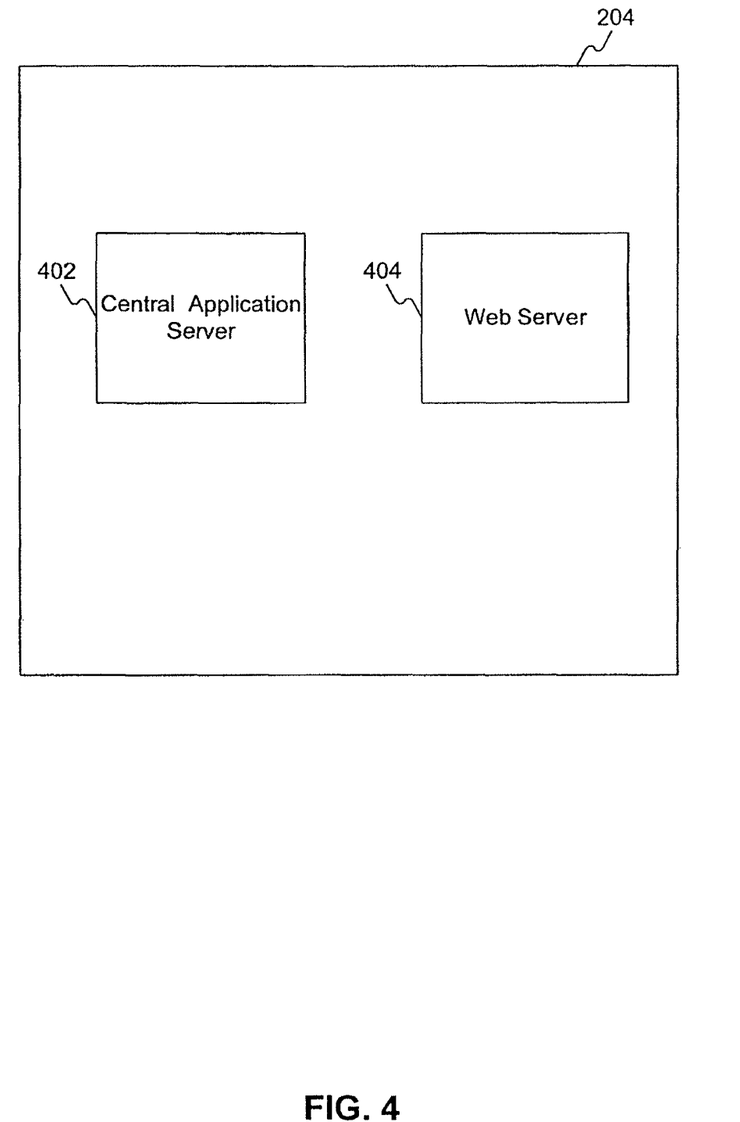
FIG. 4 is a diagram of an exemplary delivery service provider, consistent with the principles of the present invention.

FIG. 4 is a diagram of an exemplary service center consistent with the present invention. Service center 204 may include at least a central application server 402 and web server 404. The number of components in service center 204 is not limited to what is shown and other variations in the number of arrangements of components are possible, consistent with embodiments of the invention.

Central application server 402 is operable to create a barcode image using information from a request received from a client 202. Alternatively or additionally, central application server 402 may create images other than barcode images. For example, central application server 402 may create any special font, script, or other unique image.

Web server 404 provides functionality for receiving traffic over a network from a client. For example, web server 404 may be a standard web server that a user may access at a client using a web browser program, such as Internet Explorer or Netscape Communicator. Web server 404 is operable to receive requests for barcodes or other images from clients, and pass the data on to central application server 402 for processing.

Figure 5:
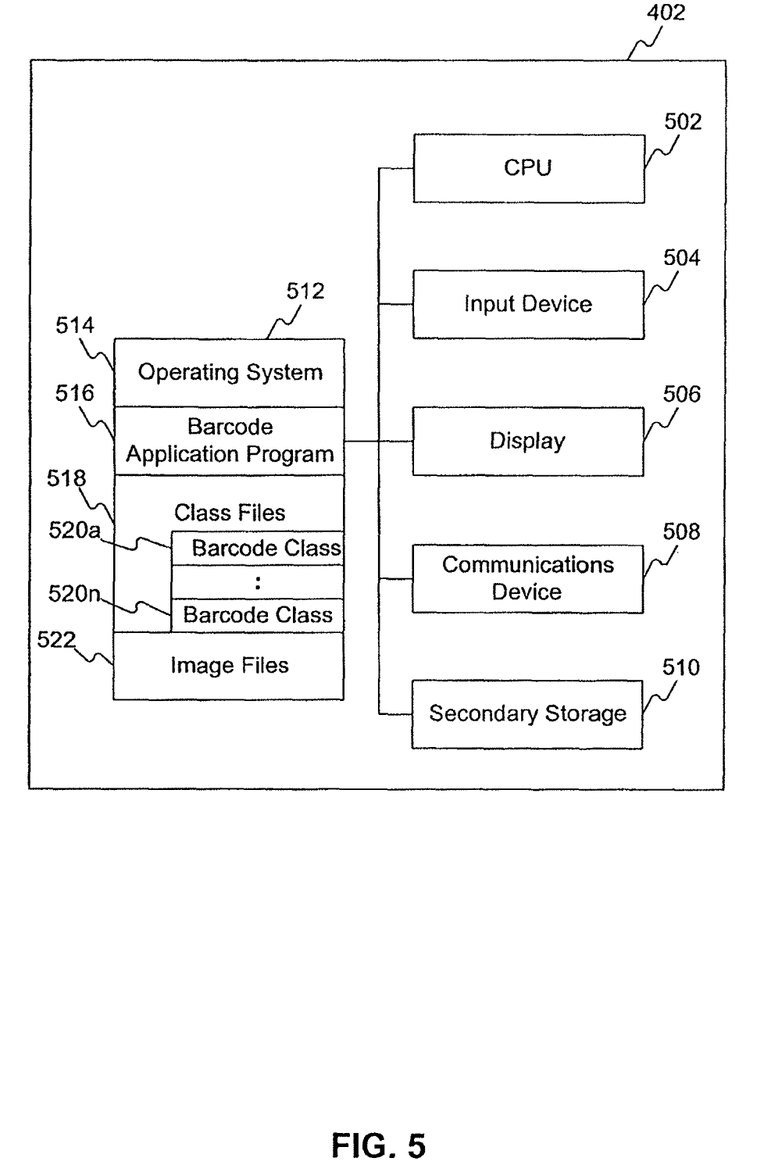
FIG. 5 is a diagram of an exemplary central application server, consistent with the principles of the present invention.

FIG. 5 is a diagram of an exemplary central application server 402, consistent with the principles of the present invention. A central application server 402 may include a CPU 502, an input device 504, a display 506, a communications device 508, a secondary storage 510, and a memory 512. The number of components in central application server 402 is not limited to what is shown and other variations in the number of arrangements of components are possible, consistent with embodiments of the invention.

CPU 502 may be one or more known processing devices, such as a Pentium™ microprocessor manufactured by Intel Corporation. Secondary storage 510 may be one or more data storage mediums such as a hard drive, CD-ROM drive, DVD drive, floppy drive, etc. Control of the central application server 402 as well as data input by a user may, be achieved through input device 504, which may comprise a keyboard, a pointer device, a mouse, etc. Data output may be presented to a user of the web server through display 506 and/or another output device (such as a printer—not shown).

Memory 512 may be one or more storage devices configured to store data used by CPU 502 to perform certain functions related to embodiments of the present invention. Memory 512 may be a magnetic, semiconductor, tape, or optical type of storage device. Software and other applications may be loaded into secondary storage 510 and/or memory 512 using, for example, a computer readable medium with software that is read by secondary storage 510. Software may also be installed via network 206 and communications device 508.

Memory 512 may include operating system 514, barcode application program 516, class files 518 (including barcode classes 520a through 520n), and image files 522. Operating system 514 may be implemented using any suitable server operating system, such as Windows 2000 Server manufactured by Microsoft Corporation. Barcode application program 516 may be operable to initiate the generation of a barcode image or other image upon receiving a request for a barcode or other image.

Class files 518 may include barcode classes 520a through 520n. Each barcode class 520 may be, for example, a Java class or other comparable class that accepts a string, encodes the string to a barcode image, and forwards the barcode image to a client 202, where the barcode image may be displayed and/or printed. In one embodiment, different barcode classes 520 may be used to produce barcodes or other images of different formats. For example, a barcode class 520a may convert strings to UPC barcodes, while a barcode class 520b may convert strings to code 39 barcodes, etc. Image files 522 may be barcode images or other images created by a barcode class 520.

Figure 6:
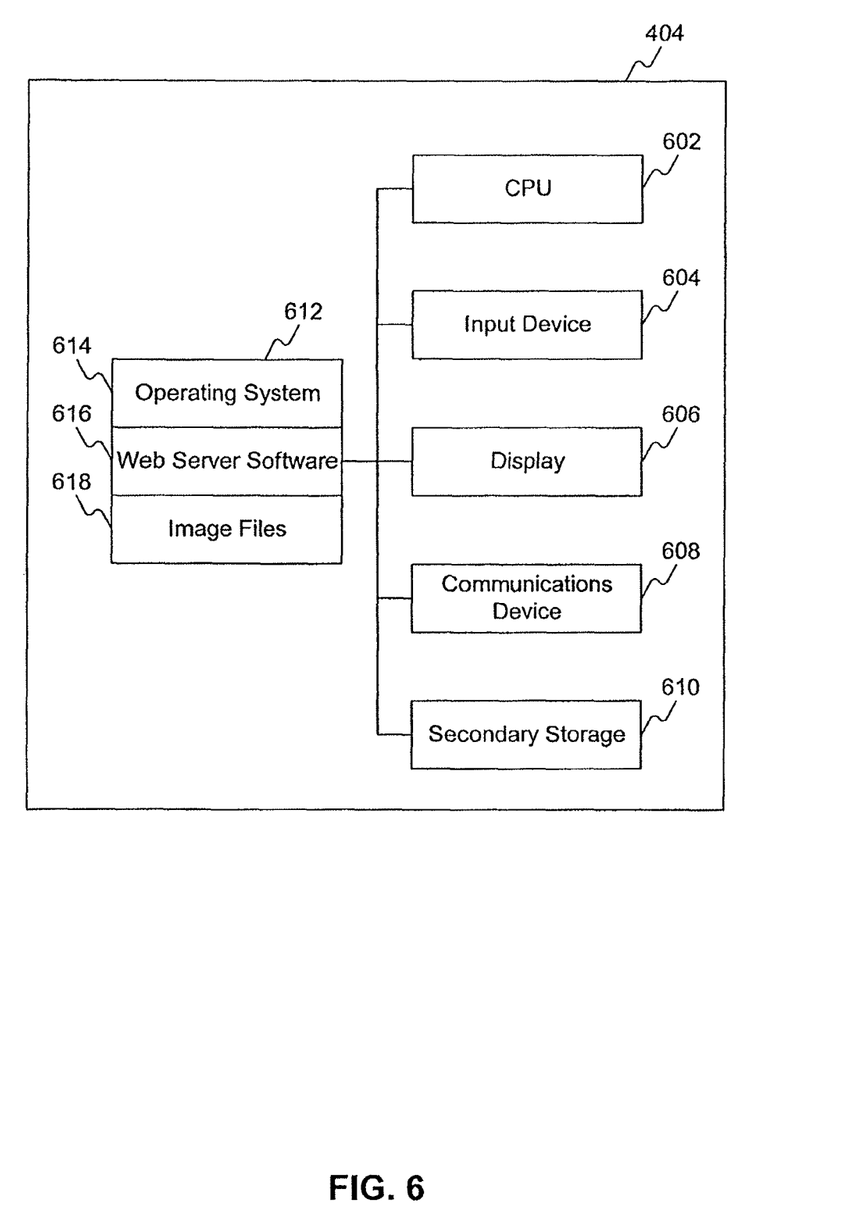
FIG. 6 is a diagram of an exemplary web server, consistent with the principles of the present invention.

FIG. 6 is a diagram of an exemplary web server 404, consistent with the principles of the present invention. A web server 404 may include a CPU 602, an input device 604, a display 606, a communications device 608, a secondary storage 610, and a memory 612. The number of components in web server 404 is not limited to what is shown and other variations in the number of arrangements of components are possible, consistent with embodiments of the invention.

CPU 602 may be one or more known processing devices, such as a Pentium™ microprocessor manufactured by Intel Corporation. Secondary storage 610 may be one or more data storage mediums such as a hard drive, CD-ROM drive, DVD drive, floppy drive, etc. Control of the web server 404 as well as data input by a user may be achieved through input device 604, which may comprise a keyboard, a pointer device, a mouse, etc. Data output may be presented to a user of the web server through display 606 and/or another output device (such as a printer—not shown).

Memory 612 may be one or more storage devices configured to store data used by CPU 602 to perform certain functions related to embodiments of the present invention. Memory 612 may be a magnetic, semiconductor, tape, or optical type of storage device. Software and other applications may be loaded into secondary storage 610 and/or memory 612 using, for example, a computer readable medium with software that is read by secondary storage 610. Software may also be installed via network 206 and communications device 608.

Memory 612 may include operating system 614, web server software 616, and image files 618. Operating system 614 may be implemented using any suitable server operating system, such as Windows 2000 Server manufactured by Microsoft Corporation. Web server software 616 may be operable to send out web pages in response to requests from remote browsers. In one embodiment, web server software 616 may be implemented using a program such as Microsoft Internet Information Server available from Microsoft Corporation. Image files 618 may be barcode images or other images created by a barcode class 520 from central application server 402, and subsequently forwarded to web server 404 for temporary storage before sending to a client 202.

System Operation

Figure 7:
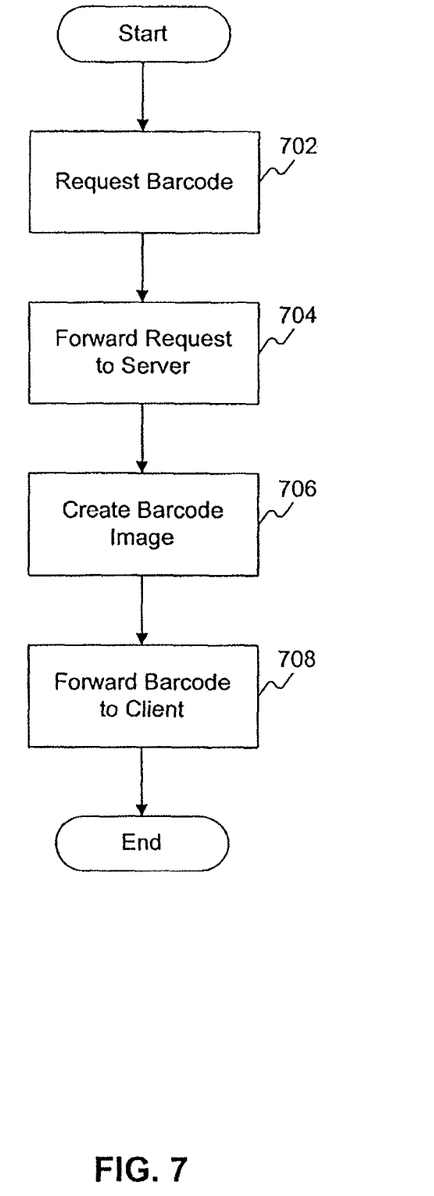
FIG. 7 is a diagram of an exemplary flowchart of a method for generating a barcode image consistent with the present invention.

FIG. 7 is a diagram of an exemplary flowchart of a method for generating a barcode image consistent with the present invention. Although the steps of the flowchart are described in a particular order, one skilled in the art will appreciate that these steps may be performed in a modified or different order. Further, one or more of the steps in FIG. 7 may be performed concurrently or in parallel.

First, a client 202 may request a barcode (step 702). For example, a user of a client 202 may enter a string of data to be converted to a barcode or other image. In one embodiment, the user may also enter a required format of the barcode or other image. For example, in addition to the information that is to be encoded as a barcode, the user may indicate that the barcode format should be Code 39. Next, via a network connection, the client 202 may forward a request to create a barcode image or other image to service center 204 (step 704). Service center 204 may then create a barcode image or other image in a specified format (step 706). Greater detail on the creation of a barcode image or other image may be found below with reference to FIGS. 8A and 8B. After the image has been created, service center 204 may forward it back to the client 202 for subsequent display and/or printing (step 708).

Figure 8A:
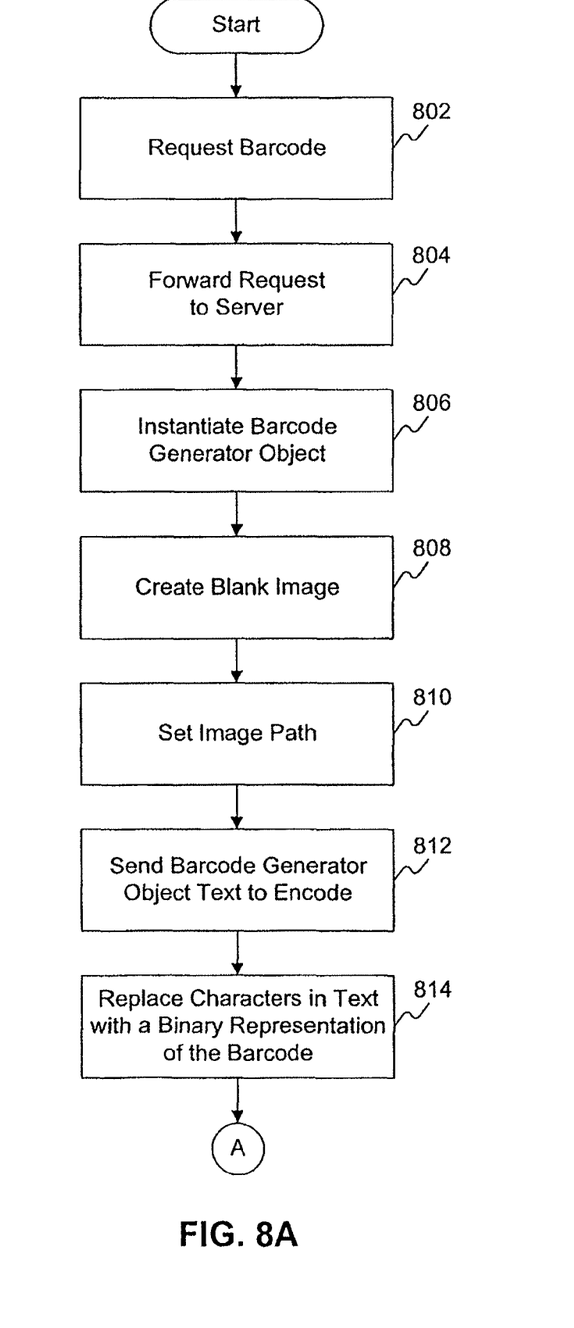
FIGS. 8A and 8B represent another diagram of an exemplary flowchart of a method for generating a barcode image consistent with the present invention.
Figure 8B:
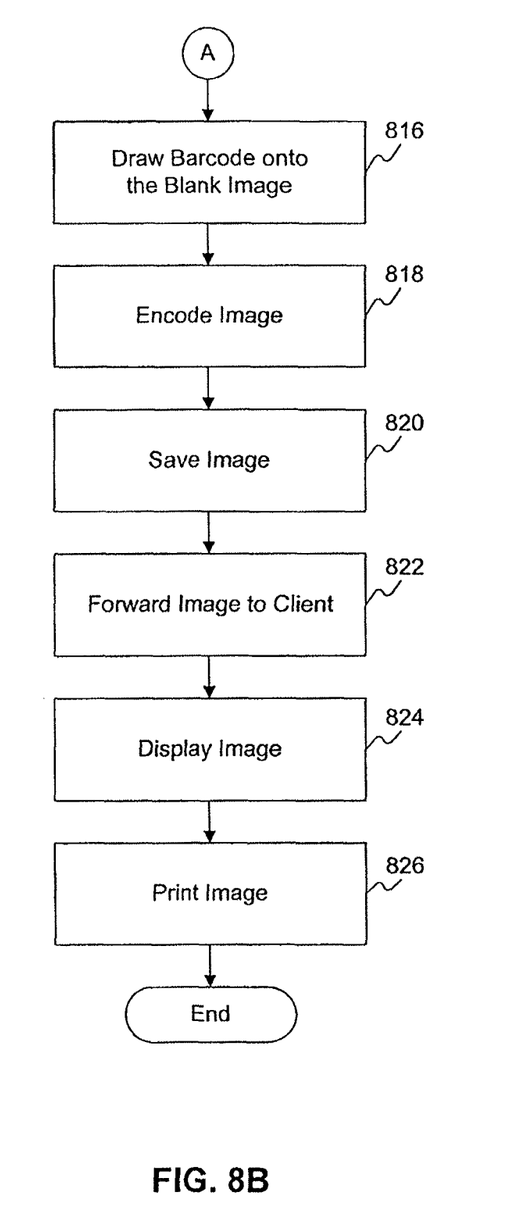

FIGS. 8A and 8B comprise an expanded diagram of an exemplary flowchart of a method for generating a barcode image consistent with the present invention. Although the steps of the flowchart are described in a particular order, one skilled in the art will appreciate that these steps may be performed in a modified or different order. Further, one or more of the steps in FIGS. 8A and 8B may be performed concurrently or in parallel.

As illustrated in FIGS. 8A and 8B, a client 202 may request a barcode (step 802). For example, a user of a client 202 may enter a string of data to be converted to a barcode or other image. In one embodiment, the user may also enter a required format of the barcode or other image. For example, in addition to the information that is to be encoded as a barcode, the user may indicate that the barcode format should be Code 39. To enter the data to be converted to a barcode, as well as the data identifying a desired format, the user, for example, may access a web page hosted by service center 204 using a browser program, and enter the data upon request. Alternatively or additionally, the user may enter the data while using an application program resident on the user's client 202.

In one embodiment, it is not necessary for a user to enter a string of data to be converted to a barcode or other image. Instead, the string to be converted may be automatically generated by the client 202. For example, client 202 may load a list of one or more strings of data to be converted. Another example is that client 202 may receive street address information as input from a user or retrieve street address information from memory, and thereafter convert the street address to a delivery code. This delivery code may be used as the string of data.

If the aforementioned street address information does not include a ZIP+4™ code, then the client 202 may perform a ZIP+4™ lookup using the address information. When a ZIP+4™ code is found, client 202 may perform a delivery point validation to ensure that the street address including the ZIP+4™ code is a delivery that is made. If so, then the street address information including the ZIP+4™ code may be converted to a delivery code to be used as the string of data. One of ordinary skill in the art will appreciate that lookups for delivery codes other than ZIP+4™ codes may be performed.

Once the user has entered data associated with a request for a barcode image or other image, or such data is otherwise retrieved or looked up, the client 202 may forward a request to service center 204 (step 804). For example, a client 202 may send a request for a barcode image to service center 204 via network 206. The request may include the data to be encoded as a barcode, as well as an indication of what type of barcode image is to be created. One of ordinary skill in the art will appreciate that images other than barcode images may be requested and created. One of ordinary skill in the art will also appreciate that the request need not include an indication of the type of barcode image or other image that is to be created. For example, service center 204 may set a default format when non indication is provided.

The request may be received by a web server 404 associated with service center 204 and subsequently passed to central application server 402 for further processing. Alternatively, central application server 402 may receive the request from the client 202 without it first passing through web server 404. In any case, once central application server 402 has received the request, it may proceed to start creating a barcode image or other image in a specified format. More particularly, barcode application program 516 may instantiate an appropriate barcode generating object (step 806).

An appropriate barcode generating object is an object from the barcode class 520 that handles the specified format of the barcode to be generated. For example, if barcode class 520a is used to create UPC barcodes, and the format specified in the request is UPC, then barcode application program 516 may instantiate a barcode generating object from barcode class 520a. One of ordinary skill in the art will appreciate that alternative programming structures may be used. For example, instead of instantiating a barcode generating object, the barcode application program may call a subroutine or otherwise start code that has functionality similar to that of objects from a barcode class, such as barcode class 520a. One of ordinary skill in the art will also appreciate that application programs other than barcode application program 516 may have the ability to instantiate a barcode generating object from a barcode class 520. In this manner, multiple application programs can use a specified barcode class 520 for multiple purposes.

After being instantiated, the barcode generating object may then create a blank image (step 808). The object also may set an image path (step 810). The image path, for example, may represent a location in a local and/or remote memory where the barcode image is to be stored upon completion. Barcode application program 516 may send the barcode generating object the text that is to be encoded as a barcode (step 812). This text, for example, may be a string of data from the request from the client 202.

Thereafter, the barcode generating object may replace characters in the text with a binary representation of the barcode (step 814). The binary representation may vary according to the selected barcode format. The barcode generating object may then draw a barcode onto the blank image created in step 808 (step 816). This barcode corresponds to the aforementioned binary representation. The barcode generating object, for example, has knowledge of the width, height, separators, and placement of lines for the barcode, and uses that knowledge to convert the string of data into a barcode. The image may then be further encoded into a different format (step 818). For example, the barcode generating object may encode the image into a GIF file using a. GIF encoder like the one available at the website, acme-.com. One of ordinary skill in the art will appreciate that the image may be converted into other formats, such as JPEG, TIFF, BMP, etc.

Once the barcode image has been encoded into a different format, the barcode generating object may proceed to save the encoded image (step 820). For example, the encoded image may be saved to a file specified by the path identified in step 810 above. This path, for example, may indicate that the encoded image is to be saved as an image file 522 in central application server 402, or as an image file 618 in web server 404. Thereafter, the saved file may be forwarded back to the client 202 that requested a barcode image (step 822). For example, the file may be may be downloaded to the client 202, where it may be displayed on a display, such as display 306, using a browser program such as browser 318 (step 824). Alternatively or additionally, the file may be saved as an image file 320 in memory 314, where it may be later retrieved for display.

In one embodiment, the file may be downloaded to the client in conjunction with the downloading of a web page from service center 204 to the client 202. For example, a user of client 202 may have previously requested that the image file be sent to client 202 as part of a template. The requested template may be processed into a web page, for example, by implementing the template in Hypertext Markup Language (HTML) with a name of the encoded image and corresponding path of the encoded image included. The web page may then be downloaded to the client 202, which processes the HTML of the web page and downloads the image identified in the HTML. The image may then be displayed using a browser program such as browser 318.

Once an image of a barcode is displayed, the client 202 may print the image with a browser program using a printer, such as printer 308 (step 826). A printed image of a barcode may be subsequently scanned by any standard barcode scanner. Because the image may be displayed and printed using a browser program, the client requires no additional software or fonts. Only a browser program is needed.

One of ordinary skill in the art will appreciate that instead of barcodes, any special font, script, or other dynamic image may be requested, generated, and printed by the user in a manner similar to that described above for barcodes. For example, a user may request, generate, and print confidential proprietary information, such as a Social Security number or password. Having confidential information generated in a GIF file or other image file may allow a user to protect this information from potential hackers and store the information in a secure manner. Another example is that a unique image may be created with specific input that could be used to verify authenticity of a user (e.g., the only way to get this particular image is to input specific information through this class that encoded the string to an image). As used herein a dynamic image refers to an image that is created on-the-fly. In other words, a dynamic image is not an image that is simply retrieved from memory upon request from a client; and does not exist before the request. Instead, the image is generated upon request from a client and may be subsequently stored or provided to the client.

One skilled in the art will also recognize that many alternative embodiments are possible. For example, a number of organizations and users may form a network and use one centralized location instead of a web server to generate barcodes. Other alternatives are possible without departing from the spirit and scope of the invention.

While the present invention has been described in connection with various embodiments, many modifications will be readily apparent to those skilled in the art. One skilled in the art will also appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. Accordingly, embodiments of the invention are not limited to the above described embodiments and examples, but instead is defined by the appended claims in light of their full scope of equivalents.

What is claimed is:

1. A computer-implemented method, comprising:
receiving, at a server, a request for a delivery barcode from a device input by a user, via a browser program, wherein the request comprises first data automatically generated by the device, to be converted to the delivery barcode and second data identifying the user, and the first data comprises an indication of a delivery barcode format specified by the user;
generating, by a processor at the server, a delivery code based on address information associated with the user, wherein the address information is retrieved from a memory at the server after the request is received at the server;
generating, by the processor, the delivery barcode in accordance with the delivery barcode format specified by the user, wherein the delivery barcode comprises information converted from the first data and the generated delivery code, and wherein the generating the delivery barcode further comprises:
instantiating, at the server, a barcode generating object from one of a plurality of barcode classes, wherein different barcode classes correspond to barcodes of different formats,
sending to the server, by the processor, the first data and generated delivery code to the barcode generating object, and
converting the first data and generated delivery code to the delivery barcode by generating a binary representation of the first data and generated delivery code;
verifying, by the processor, based on the second data, the authenticity of the user;
generating, by the processor, in addition to the delivery barcode, a dynamic image based on the second data, wherein the dynamic image is generated after verification of the authenticity of the user based on the input of the second data;
providing the delivery barcode and the dynamic image to the user device via the browser program; and
printing the delivery barcode and the dynamic image, via the web browser program, for application to the delivery item, the dynamic image verifying an authenticity of the user.

2. The method of claim 1, wherein the first data further comprises an indication of an image path specified by the user.

3. The method of claim 1, wherein the request comprises a string of data that is automatically generated by the user device.

4. The method of claim 1, further comprising:
generating, by the barcode generating object, a blank image;
drawing the delivery barcode onto the blank image, wherein the delivery barcode corresponds to the generated binary representation; and
saving the image to an image path, wherein the image path is determined by the barcode generating object.

5. The method of claim 4, wherein the format of the saved image comprises one of: GIF, JPEG, TIFF, and BMP.

6. A non-transitory computer-readable storage medium containing instructions which, when executed by a processor, cause the processor to perform a method, comprising:
receiving a request for a delivery barcode from a device input by a user, via a browser program, wherein the request comprises first data automatically generated by the device, to be converted to the delivery barcode and second data identifying the user, and the first data comprises an indication of a delivery barcode format specified by the user;
generating a delivery code based on address information associated with the user, wherein the address information is retrieved from a memory after the request for the dynamic image is received at a server;
generating the delivery barcode in accordance with the delivery barcode format specified by the user, wherein the delivery barcode comprises information converted from the first data and the generated delivery code, and wherein the generating the delivery barcode further comprises:
instantiating, at the server, a barcode generating object from one of a plurality of barcode classes, wherein different barcode classes correspond to barcodes of different formats,
sending to the server, by the processor, the first data and generated delivery code to the barcode generating object, and
converting the first data and generated delivery code to the delivery barcode by generating a binary representation of the first data and delivery code;
verifying, based on the second data, the authenticity of the user;
generating, in addition to the delivery barcode, a dynamic image based on the second data, wherein the dynamic image is generated after verification of the authenticity of the user based on the input of the second data;

providing the delivery barcode and the dynamic image to the user device via the browser program; and printing the delivery barcode and the dynamic image, via the web browser program, for application to the delivery item, the dynamic image verifying an authenticity of the user.

7. The computer-readable storage medium of claim 6, wherein the first data further comprises an indication of an image path specified by the user.

8. The computer-readable storage medium of claim 6, wherein the request comprises a string of data that is automatically generated by the user device.

9. The computer-readable storage medium of claim 6, further comprising:

generating, by the barcode generating object, a blank image;

drawing the delivery barcode onto the blank image, wherein the delivery barcode corresponds to the generated binary representation; and saving the image to an image path, wherein the image path is determined by the barcode generating object.

10. The computer-readable storage medium of claim 9, wherein the format of the saved image comprises one of: GIF, JPEG, TIFF, and BMP.

11. A server, comprising:

a memory; and a processor, the processor configured to:

receive a request for a delivery barcode from a device input by a user, via a browser program, wherein the request comprises first data automatically generated by the device, to be converted to the delivery barcode and second data identifying the user, and the first data comprises an indication of a delivery barcode format specified by the user;

generate a delivery code based on address information associated with the user, wherein the address information is retrieved from a memory after the request for the dynamic image is received at the server;

generate the delivery barcode in accordance with the delivery barcode format specified by the user, wherein the delivery barcode comprises information converted from the first data and the generated delivery code, and wherein the processor is further configured to:

cause the server to instantiate a barcode generating object from one of a plurality of barcode classes, wherein different barcode classes correspond to barcodes of different formats, send, to the server, the first data and generated delivery code to the barcode generating object, and convert the first data and generated delivery code to the delivery barcode by generating a binary representation of the first data and generated delivery code;

verify, based on the second data, the authenticity of the user;

generate, in addition to the delivery barcode, a dynamic image based on the second data, wherein the dynamic image is generated after verification of the authenticity of the user based on the input of the second data;

provide the delivery barcode and the dynamic image to the user device via the browser program; and printing the delivery barcode and the dynamic image, via the web browser program, for application to the delivery item, the dynamic image verifying an authenticity of the user.

12. The server of claim 11, wherein the first data further comprises an indication of an image path specified by the user.

13. The server of claim 11, wherein the request comprises a string of data that is automatically generated by the user device.

14. The server of claim 11, wherein the processor is further configured to:

generate, by the barcode generating object, a blank image;

draw the delivery barcode onto the blank image, wherein the delivery barcode corresponds to the generated binary representation; and save the image to an image path, wherein the image path is determined by the barcode generating object.

15. The server of claim 14, wherein the format of the saved image comprises one of: GIF, JPEG, TIFF, and BMP.

* * * * *